(12) United States Patent
Hatano et al.

(10) Patent No.: US 11,697,464 B2
(45) Date of Patent: Jul. 11, 2023

(54) MOTORCYCLE SEAT RAIL

(71) Applicant: SUZUKI MOTOR CORPORATION, Hamamatsu (JP)

(72) Inventors: Daisuke Hatano, Hamamatsu (JP); Yudai Murase, Hamamatsu (JP); Michinobu Fujita, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 105 days.

(21) Appl. No.: 17/499,996

(22) Filed: Oct. 13, 2021

(65) Prior Publication Data

US 2022/0119059 A1 Apr. 21, 2022

(30) Foreign Application Priority Data

Oct. 19, 2020 (JP) .................................. 2020-175343

(51) Int. Cl.
*B62J 1/08* (2006.01)
*B62K 19/16* (2006.01)

(52) U.S. Cl.
CPC ................. *B62J 1/08* (2013.01); *B62K 19/16* (2013.01)

(58) Field of Classification Search
CPC ............. B62K 11/04; B62K 11/02; B62J 1/08
See application file for complete search history.

(56) References Cited

U.S. PATENT DOCUMENTS

| | | | |
|---|---|---|---|
| 2013/0278025 A1* | 10/2013 | Wakabayashi | B62K 11/04 297/195.1 |
| 2018/0339739 A1* | 11/2018 | Kondo | B62J 25/06 |
| 2019/0300086 A1* | 10/2019 | Enami | B62J 1/08 |
| 2020/0247082 A1* | 8/2020 | Hatano | B32B 5/12 |
| 2021/0147025 A1* | 5/2021 | Hatano | B62J 1/08 |

FOREIGN PATENT DOCUMENTS

| | | | | |
|---|---|---|---|---|
| EP | 3300998 A1 * | 4/2018 | .......... | B60K 15/067 |
| WO | 2012/090848 A1 | 7/2012 | | |

* cited by examiner

*Primary Examiner* — Milton Nelson, Jr.
(74) *Attorney, Agent, or Firm* — Troutman Pepper Hamilton Sanders LLP (57) ABSTRACT

A seat rail installed on a vehicle body of a motorcycle. The seat rail includes an upper lateral member located on a lateral side in a width direction of the vehicle body and made of a fiber reinforced resin, the upper lateral member including a lower flange that protrudes in the width direction of the vehicle body from a lower edge of the upper lateral member. Furthermore, the seat rail includes a lower lateral member located downward from the upper lateral member and made of metal, and a lower surface of the lower flange of the upper lateral member is joined to an upper surface of the lower lateral member by adhesive.

4 Claims, 5 Drawing Sheets

MOTORCYCLE SEAT RAIL

CROSS REFERENCE TO RELATED APPLICATION

The present application claims priority of Japanese Patent Application No. 2020-175343 filed Oct. 19, 2020. The entire contents of which are hereby incorporated by reference.

TECHNICAL FIELD

The present invention relates to a motorcycle seat rail installed on a vehicle body of a motorcycle.

BACKGROUND

A seat rail installed on a motorcycle may be used for supporting a seat, a fuel tank, and the like. Such a seat rail is required to have greater strength in order to support the seat, the fuel tank, and the like, and it is also required to have an enhanced vibration damping effect from the viewpoint of improving ride comfort. In order to satisfy such requirements, various motorcycle seat rails have been proposed.

An example of such a motorcycle seat rail is a motorcycle seat frame including a bottom surface portion extending in a vehicle front-rear direction and side surface portions standing upward at least at positions on both sides in a vehicle width direction of the bottom surface portion, the bottom surface portion and the side surface portions being made of a fiber reinforced resin (for example, see WO 2012/090848 A1).

SUMMARY

However, when the bottom surface portion and the left and right side surface portions made of the fiber reinforced resin are integrally formed with each other as in the above example of the motorcycle seat rail, heat may be trapped in an internal space surrounded by the bottom surface portion and the left and right side surface portions, and the heat may cause thermal deterioration of the resin in the fiber reinforced resin. The thermal deterioration may reduce strength of the seat rail.

In addition, since fibers are generally strong against tension but weak against compression, a seat rail made of a fiber reinforced resin using these fibers has low strength against compressive deformation. In the example of the motorcycle seat rail, since a lower part of the seat rail is compressively deformed when a load is applied to a rear part of the seat rail by an occupant, luggage, and the like, the strength of the lower part of the seat rail may not be sufficiently ensured.

In view of these circumstances, the motorcycle seat rail is preferably configured such that the vibration damping effect of the seat rail can be sufficiently ensured and the strength of the seat rail can be efficiently improved.

In order to solve the problems, a motorcycle seat rail according to an aspect is a motorcycle seat rail installed on a vehicle body of a motorcycle, the motorcycle seat rail including: an upper lateral member located on a lateral side in a width direction of the vehicle body and made of a fiber reinforced resin, the upper lateral member including a lower flange that protrudes in the width direction of the vehicle body from a lower edge of the upper lateral member; and a lower lateral member located downward from the upper lateral member and made of metal, wherein a lower surface of the lower flange of the upper lateral member is joined to an upper surface of the lower lateral member with an adhesive.

In a motorcycle seat rail according to an aspect, a vibration damping effect of a seat rail can be sufficiently ensured, and strength of the seat rail can be efficiently improved.

DETAILED DESCRIPTION

A motorcycle seat rail according to an embodiment will be described together with a motorcycle in which the seat rail is installed. Here, the motorcycle in which the seat rail for the motorcycle (hereinafter, simply referred to as a "seat rail" as necessary) is installed includes, typically, one front wheel and one rear wheel. However, the motorcycle may include two front wheels and one rear wheel.

Figure 1:
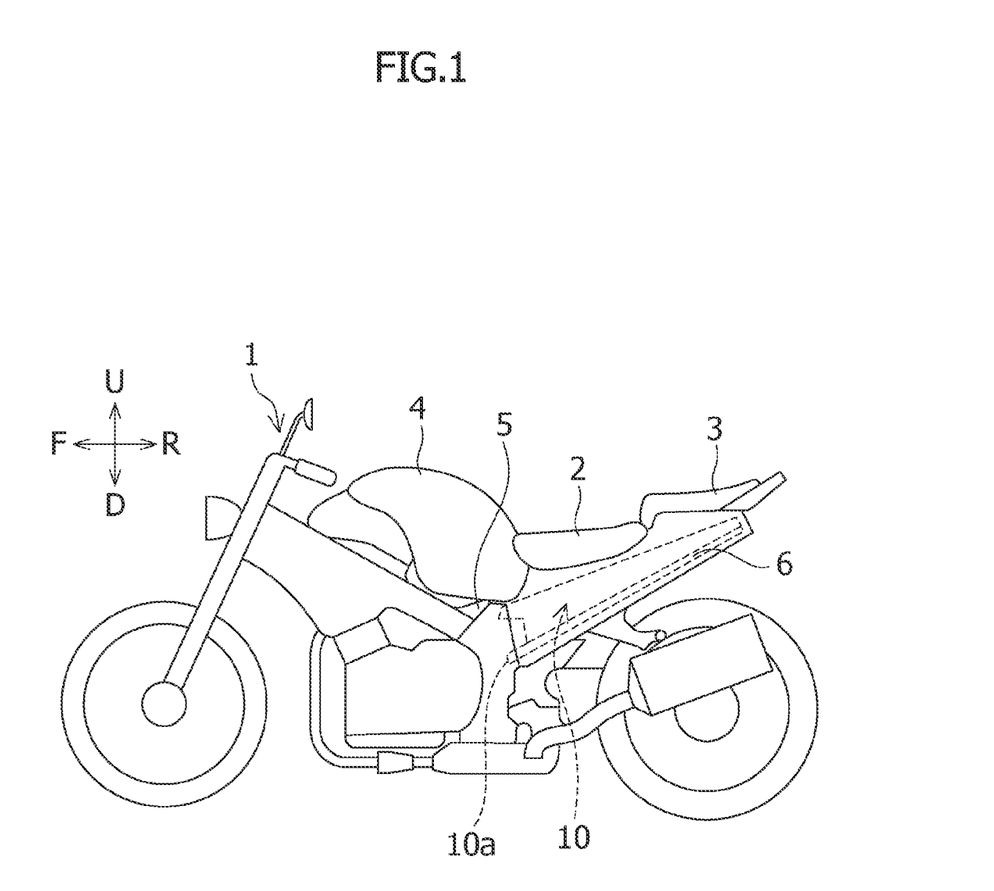
FIG. 1 is a side view schematically showing a motorcycle including a seat rail according to an embodiment.
Figure 2:
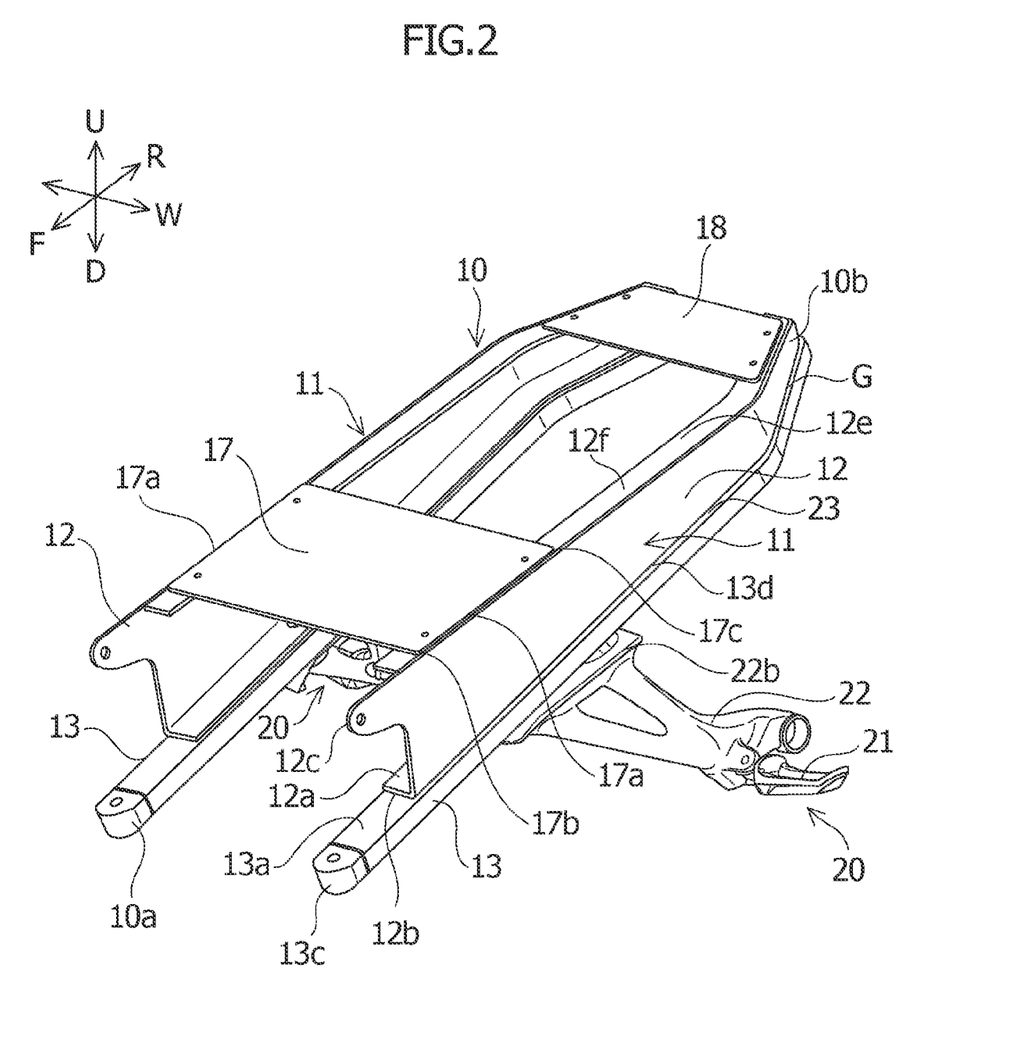
FIG. 2 is a perspective view schematically showing the seat rail according to the embodiment together with a footrest attached to the seat rail.
Figure 3:
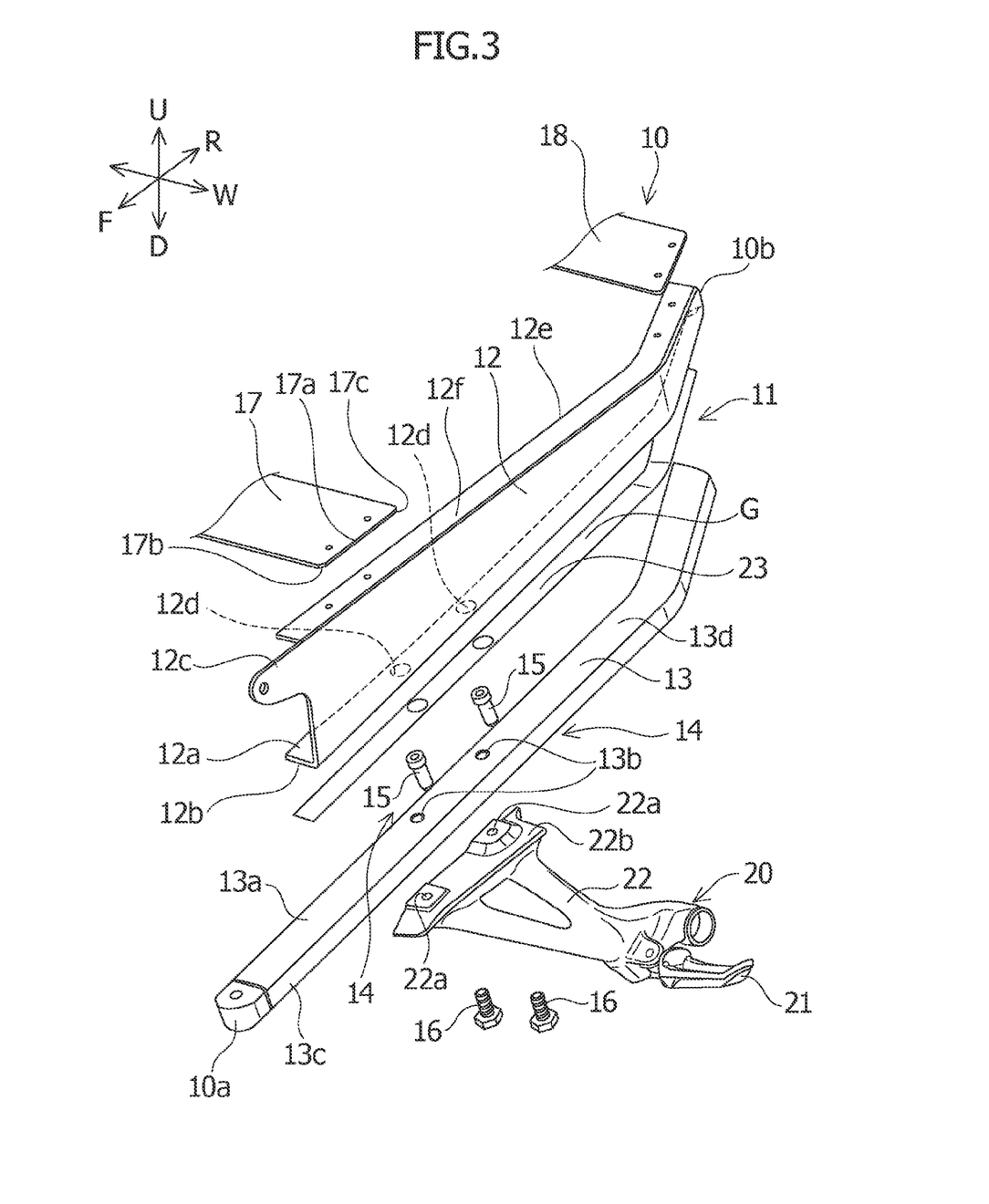
FIG. 3 is an exploded perspective view schematically showing a left half of the seat rail and the footrest in FIG. 2.
Figure 4:
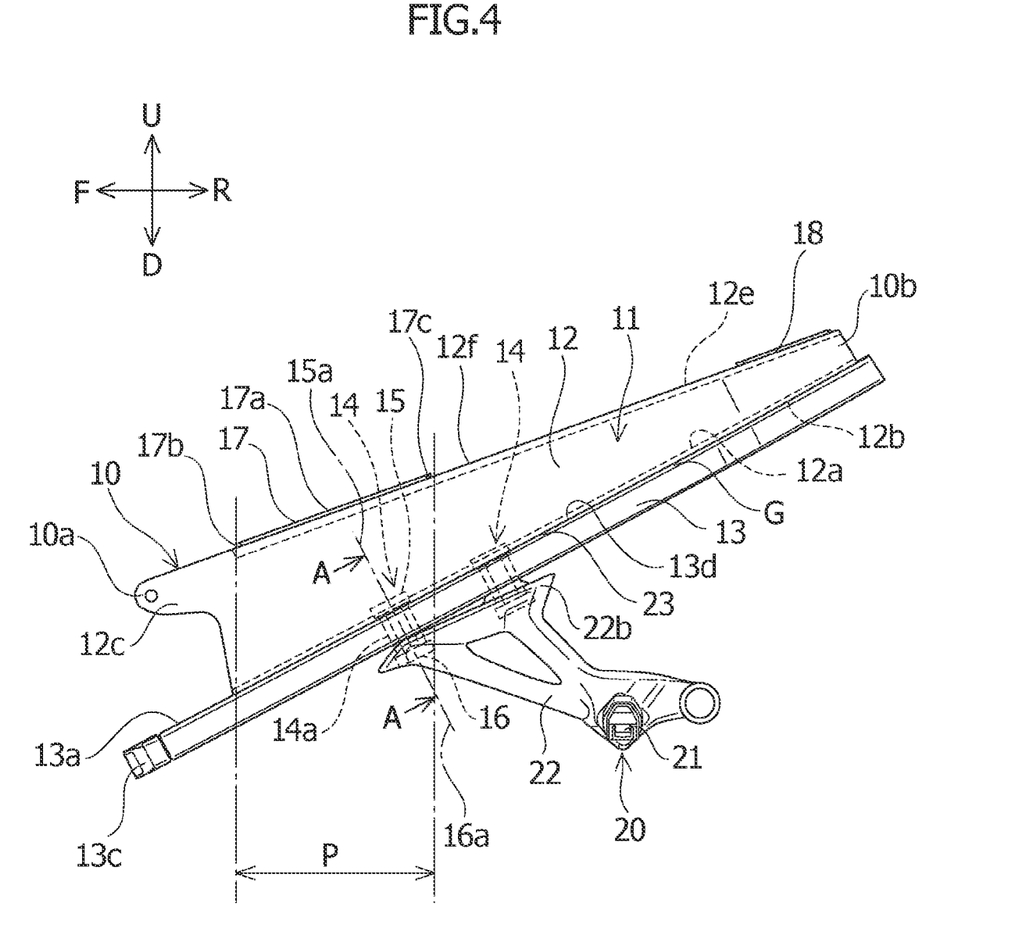
FIG. 4 is a side view schematically showing the seat rail according to the embodiment together with the footrest attached to the seat rail.
Figure 5:
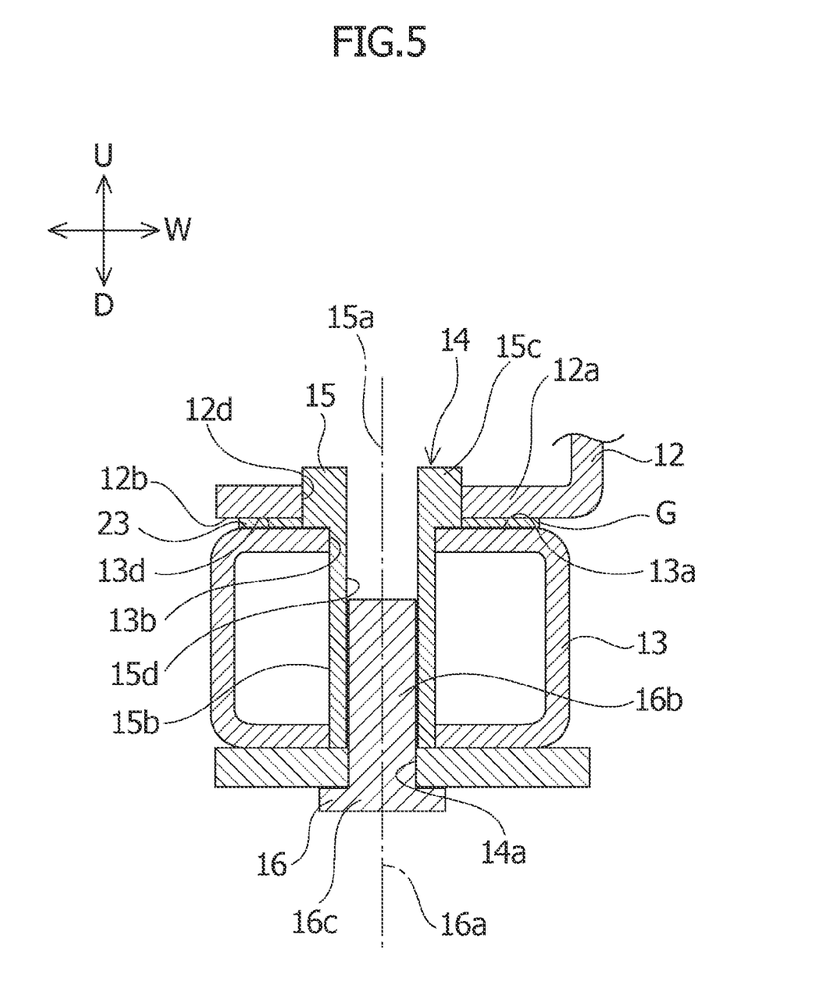
FIG. 5 is a cross-sectional view taken along a line A-A in FIG. 4.

In FIGS. 1 to 4 of the present embodiment, a front of a vehicle body 1 of the motorcycle (hereinafter, simply referred to as "front" as necessary) is indicated by a one-headed arrow F, and a rear of the vehicle body 1 (hereinafter, simply referred to as "rear" as necessary) is indicated by a one-headed arrow R. Therefore, a front-rear direction of the vehicle body 1 (hereinafter, simply referred to as a "front-rear direction" as necessary) is indicated by the one-headed arrow F and the one-headed arrow R. In FIGS. 2, 3, and 5, a width direction of the vehicle body 1 (hereinafter, simply referred to as a "width direction" as necessary) is indicated by a two-headed arrow W. In FIGS. 1 to 5, an upper side of the vehicle body 1 (hereinafter, simply referred to as an "upper side" as necessary) is indicated by a one-headed arrow U, and a lower side of the vehicle body 1 (hereinafter, simply referred to as a "lower side" as necessary) is indicated by a one-headed arrow D. An up-down direction of the vehicle body 1 (hereinafter, simply referred to as an "up-down direction" as necessary) is indicated by the one-headed arrow U and the one-headed arrow D.

An outline of a seat rail 10 and the motorcycle according to the present embodiment will be described with reference to FIGS. 1 to 5. In other words, the seat rail 10 and the motorcycle are generally configured as follows. As shown in FIG. 1, the seat rail 10 (indicated by a broken line in FIG. 1) is installed in the vehicle body 1 of the motorcycle.

As shown in FIG. 2, the seat rail 10 includes lateral member assemblies 11 located at lateral sides in the width direction of the vehicle body 1. Specifically, the seat rail 10 includes two lateral member assemblies 11 located at both lateral sides of the vehicle body 1 in the width direction. The two lateral member assemblies 11 are spaced apart from each other in the width direction. As shown in FIGS. 2 to 4, each of the lateral member assemblies 11 includes an upper lateral member 12 made of fiber reinforced resin. The upper lateral member 12 of each of the lateral member assemblies 11 is located at a lateral side in the width direction.

Here, the seat rail 10 according to the present embodiment is configured such that both of the two lateral member assemblies 11 include components that will be described in detail below. The components of the two lateral member assemblies 11 are substantially symmetrical in the width direction. However, the seat rail may be configured such that only one of the two lateral member assemblies 11 includes the following components. Based on these considerations, in the following, unless the two lateral member assemblies 11 and the components related to the two lateral member assemblies 11 are specifically described, it is assumed that the components of one of the two lateral member assemblies 11 are representatively described.

Referring to FIGS. 2 to 5, each of the upper lateral members 12 includes a lower flange 12a protruding in the width direction from a lower edge of the upper lateral member 12. Each of the lateral member assemblies 11 includes a lower lateral member 13 located below the upper lateral member 12 of the lateral member assembly 11. The lower lateral member 13 of each of the lateral member assemblies 11 is made of metal. A lower surface 12b of the lower flange 12a of the upper lateral member 12 in each of the lateral member assemblies 11 is joined to an upper surface 13a of the lower lateral member 13 in such a lateral member assembly 11 by an adhesive G.

Furthermore, the seat rail 10 and the motorcycle according to the present embodiment can be generally configured as follows. Referring to FIGS. 2 to 5, each of the lower lateral members 13 is a hollow member extending from the front to the rear. A footrest assembly 20 including a footrest main body 21 and a footrest bracket 22 is attached to each of the lateral member assemblies 11. Specifically, the footrest bracket 22 of the footrest assembly 20 is fastened to each of the lateral member assemblies 11. As shown in FIGS. 3 and 5, the seat rail 10 includes a fastening portion 14 configured to fasten together the lower lateral member 13 of each of the lateral member assembly 11 and the footrest bracket 22 to be attached to the lateral member assembly 11 using a collar 15 and a fastening member 16.

As shown in FIG. 5, the collar 15 includes a shaft body part 15b extending along an axial line 15a thereof. The collar 15 further includes a head part 15c protruding from the shaft body part 15b so as to be away from the axial line 15a thereof. The collar 15 includes a female screw part 15d formed on the shaft body part 15b so as to extend from a tip to a base end of the shaft body part 15b along the axial line 15a thereof. The fastening member 16 includes a male screw part 16b extending along an axial line 16a thereof. The fastening member 16 further includes a head part 16c protruding from the male screw part 16b so as to be away from the axial line 16a thereof. For example, the fastening member 16 may be a bolt. However, the fastening member is not limited to the bolt.

The male screw part 16b of the fastening member 16 can be screwed into the female screw part 15d of the collar 15 along the axial lines 15a and 16a of the collar 15 and the fastening member 16 from the tip of the shaft body 15b of the collar 15. A through hole 14a is formed in the fastening portion 14 such that the shaft body part 15b of the collar 15 can be inserted. The through hole 14a is formed from a through hole 13b of the lower lateral member 13 and a through hole 22a of the footrest bracket 22. While the male screw part 16b of the fastening member 16 is screwed into the female screw part 15d of the shaft body part 15b of the collar 15 inserted into the through hole 14a of the fastening portion 14, the lower lateral member 13 and the footrest bracket 22 are nipped between the head part 15c of the collar 15 and the head part 16c of the fastening member 16.

As shown in FIGS. 2 to 4, the seat rail 10 includes a coupling member 17 extending so as to couple the two upper lateral members 12, which are spaced apart from each other in the width direction, to each other. The coupling member 17 includes two lateral edges 17a which are located at both lateral sides in the width direction, respectively. As shown in FIG. 4, when the vehicle body 1 is viewed in the width direction, the fastening portion 14 is overlapped on a region P between a front end 17b and a rear end 17c of each of the lateral edge 17a in the coupling member 17 in the front-rear direction.

Referring to FIGS. 1 and 2, the motorcycle according to the present embodiment can be configured in detail as follows. As shown in FIG. 1, the vehicle body 1 of the motorcycle includes a seat 2, a luggage rack 3, and a fuel tank 4. The seat 2 is supported from below by the seat rail 10. Referring to FIGS. 1 and 2, the seat 2 is supported from below by the coupling member 17 of the seat rail 10.

As shown in FIG. 1, the luggage rack 3 is located behind the seat 2. The luggage rack 3 is adjacent to the seat 2 in the front-rear direction. The fuel tank 4 is located in front of the seat 2. The fuel tank 4 is adjacent to the seat 2 in the front-rear direction.

The vehicle body 1 of the motorcycle includes a main frame 5. The main frame 5 is located in front of the seat rail 10, and is located below the fuel tank 4. The main frame 5 is adjacent to the seat rail 10 in the front-rear direction. Referring to FIGS. 1 and 2, a front end part 10a of the seat rail 10 in the front-rear direction is attached to the main frame 5. Specifically, front end parts 12c and 13c of the upper lateral member 12 and the lower lateral member 13 of the seat rail 10 in the front-rear direction are attached to the main frame 5.

As shown in FIG. 1, the vehicle body 1 of the motorcycle includes an outer panel 6. The outer panel 6 is located below the seat 2. The outer panel 6 is also adjacent to the seat 2 in the up-down direction. The outer panel 6 covers the seat rail 10 from both outer sides in the width direction. However, the vehicle body may be configured so as not to include the outer panel. In this case, the vehicle body may be configured such that the upper lateral member is exposed to the outside of the vehicle body as an exterior member.

Referring to FIGS. 2 to 5, the seat rail 10 according to the present embodiment can be configured in detail as follows. As shown in FIGS. 2 to 4, the seat rail 10 includes an additional coupling member 18 extending to couple the two upper lateral members 12 to each other, in addition to the coupling member 17 described above. The additional coupling member 18 is located behind the coupling member 17. In the following, as necessary, the coupling member 17 will be referred to as a front coupling member 17, and the additional coupling member 18 will be referred to as a rear coupling member 18. When the seat rail 10 includes a plurality of coupling members, the front coupling member 17 can be located at the frontmost position among the plurality of coupling members. The rear coupling member 18 can be located at the rearmost position among the plurality of coupling members.

The front coupling member 17 is located closer to the front end part 10a of the seat rail 10 in the front-rear direction. As described above, such a front coupling member 17 supports a front part of the seat 2 in the front-rear direction from below. The rear coupling member 18 is located closer to a rear end part 10b of the seat rail 10 in the front-rear direction. The rear coupling member 18 can be located to correspond to the rear end part 10*b* of the seat rail 10 in the front-rear direction. The rear coupling member 18 supports a rear part of the seat 2 in the front-rear direction and the luggage rack 3 from below. The front and rear coupling members 17 and 18 are spaced apart from each other in the front-rear direction.

The footrest assembly 20 is configured for a pillion rider. The footrest main body 21 of the footrest assembly 20 is formed to protrude outward in the width direction of the vehicle body 1 from a lower end part of the footrest bracket 22 in the up-down direction. As shown in FIGS. 2 to 5, the footrest bracket 22 includes an attachment portion 22*b* configured to attach the footrest bracket 22 to the lower lateral member 13. The attachment portion 22*b* is disposed at an upper end part of the footrest bracket 22 in the up-down direction. The through hole 22*a* of the footrest bracket 22 described above is formed to penetrate the attachment portion 22*b*.

As shown in FIG. 3, each of the lateral member assemblies 11 is provided with the two fastening portions 14 as described above. In this case, the lower lateral member 13 includes two through holes 13*b*, and the footrest bracket 22 includes two through holes 22*a*. Each of the lateral member assemblies 11 includes two collars 15 and two fastening members 16. Such two fastening portions 14 are spaced apart from each other in the front-rear direction. However, each of the lateral member assemblies may also be provided with one fastening portion or with three or more fastening portions.

Referring to FIGS. 2 to 5, the lateral member assembly 11 can be configured in detail as follows. The fiber reinforced resin used for the upper lateral member 12 of the lateral member assembly 11 is a continuous fiber reinforced resin or a discontinuous fiber reinforced resin. Such a fiber reinforced resin contains a predetermined resin material and a plurality of fibers.

As the resin material of the fiber reinforced resin, a thermoplastic resin or a thermosetting resin can be used. Examples of the thermoplastic resins may include polyamide and polypropylene. Examples of the thermosetting resins may include an epoxy resin and a phenol resin. Examples of the fibers of the fiber reinforced resin may include a carbon fiber, a glass fiber, a polyamide fiber, and a polyethylene fiber. When the fiber reinforced resin is a discontinuous fiber reinforced resin, a length of one fiber may preferably be 10 mm or more from the viewpoint of reinforcement effect. However, the length of one fiber is not limited thereto.

The upper lateral member 12 is produced by press-molding of a panel material configured as a laminated structure in which a plurality of layers made of a fiber reinforced resin are laminated. However, the method of producing the upper lateral member is not limited thereto.

As shown in FIGS. 3 and 5, the lower flange 12*a* of the upper lateral member 12 is formed with a through hole 12*d* through which the head part 15*c* of the collar 15 can be inserted. The through hole 12*d* of the lower flange 12*a* is disposed to correspond to the through hole 14*a* of the fastening portion 14. In particular, the head part 15*c* of the collar 15 is preferably fitted into the through hole 12*d* of the lower flange 12*a* such that the upper lateral member 12 and the lower lateral member 13 are positioned during the attachment.

As shown in FIGS. 2 to 4, the lower flange 12*a* of the upper lateral member 12 protrudes toward the center of the vehicle body 1 in the width direction from the lower edge of the upper lateral member 12. The lower flange 12*a* is formed in an elongated shape with the front-rear direction being a longitudinal direction. The entire lower surface 12*b* of the lower flange 12*a* in the upper lateral member 12 is in contact with the upper surface 13*a* of the lower lateral member 13, and is joined to the upper surface 13*a* of the lower lateral member 13 by the adhesive G.

The upper lateral member 12 includes an upper flange 12*e* protruding in the width direction from the upper edge thereof. The upper flange 12*e* of the upper lateral member 12 can also protrude toward the center of the vehicle body 1 in the width direction from the upper edge of the upper lateral member 12. The front and rear coupling members 17 and 18 are in contact with an upper surface 12*f* of the upper flange 12*e*, and are attached to the upper surface 12*f* of the upper flange 12*e*. The lower and upper flanges 12*a* and 12*e* are disposed to overlap when viewed in the up-down direction.

A metal used for the lower lateral member 13 of the lateral member assembly 11 may be selected from aluminum, iron, etc., and alloys thereof. However, the metal used for the lower lateral member is not limited thereto.

As shown in FIGS. 2 to 4, the lower lateral member 13 is formed in an elongated shape with the front-rear direction being a longitudinal direction. The upper surface 13*a* of the lower lateral member 13 includes a contact area 13*d* that comes into contact with the lower surface 12*b* of the lower flange 12*a*. The contact area 13*d* of the lower lateral member 13 is formed to correspond to the entire lower surface 12*b* of the lower flange 12*a*. The front end part 13*c* of the lower lateral member 13 protrudes forward from the front end part 12*c* of the upper lateral member 12. The front end part 13*c* of the lower lateral member 13 is located in front of the contact area 13*d* of the lower lateral member 13.

The adhesive G used for the lateral member assembly 11 may be a synthetic adhesive. Examples of the synthetic adhesive may include an acrylic adhesive, a urethane adhesive, an EVA adhesive, an epoxy adhesive, and other adhesives. However, the adhesives are not limited thereto.

In the lateral member assembly 11, the adhesive G is applied between the lower surface 12*b* of the lower flange 12*a* of the upper lateral member 12 and the upper surface 13*a* of the lower lateral member 13, the adhesive G thereby forming an adhesive layer 23. However, the adhesive can also be used on an adhesive tape sandwiched between the lower surface of the lower flange of the upper lateral member and the upper surface of the lower lateral member.

As described above, the seat rail 10 according to the present embodiment is the motorcycle seat rail 10 installed on the vehicle body 1 of the motorcycle, the motorcycle seat rail 10 including: the upper lateral members 12 located on the lateral sides in the width direction of the vehicle body 1 and made of the fiber reinforced resin, each of the upper lateral members 12 including the lower flange 12*a* that protrudes in the width direction of the vehicle body 1 from a lower edge of the upper lateral member 12; and the lower lateral members 13 located downward from the upper lateral members 12 and made of the metal, wherein the lower surfaces 12*b* of the lower flanges 12*a* of the upper lateral members 12 are joined to the upper surfaces 13*a* of the lower lateral members 13 with the adhesive G.

In such a seat rail 10, the lower lateral member 13 made of the metal has increased thermal conductivity, and heat in an internal space of the seat rail 10 is efficiently released from the upper lateral member 12 made of the fiber reinforced resin to the lower lateral member 13. Therefore, it is possible to prevent heat from being trapped in the internal space of the seat rail 10 and to prevent thermal deterioration of the resin in the fiber reinforced resin forming the upper lateral member 12. As a result, the seat rail 10 can be improved in strength. Furthermore, the lower lateral member 13 made of the metal has higher strength than the upper lateral member 12 made of the fiber reinforced resin, and thus it is possible to improve strength against compressive deformation of the lower part of the seat rail 10 that may occur when a load is applied to the rear part of the seat rail 10 by ab occupant, luggage, and the like. Therefore, the strength of the seat rail 10 can be efficiently improved.

Furthermore, the upper lateral member 12 made of the fiber reinforced resin has a higher vibration damping effect than the lower lateral member 13 made of the metal, and such an upper lateral member 12 is disposed closer to the seat 2 than the lower lateral member 13 made of the metal, whereby the vibration damping effect of the seat rail 10 can be sufficiently ensured. In addition, since the adhesive G located between the lower surface 12*b* of the lower flange 12*a* of the upper lateral member 12 and the upper surface 13*a* of the lower lateral member 13 also provides damping performance, the vibration damping effect of the seat rail 10 can be reliably ensured.

In the seat rail 10 according to the present embodiment, the lower lateral members 13 are the hollow members extending from the front of the vehicle body 1 toward a rear of the vehicle body 1. Therefore, the damping performance of the lower lateral member 13 can be improved, and as a result, the vibration damping effect of the seat rail 10 can be reliably ensured.

In the seat rail 10 according to the present embodiment, the fastening portion 14 is provided to fasten the lower lateral member 13 and the footrest bracket 22 using the collar 15 and the fastening member 16, the collar 15 includes the shaft body part 15*b* extending along the axial line 15*a* of the collar 15, the head part 15*c* protruding from the shaft body part 15*b* so as to be away from the axial line 15*a*, and the female screw part 15*d* formed on the shaft body part 15*b* so as to extend from the tip toward the base end of the shaft body part 15*b* along the axial line 15*a*, the fastening member 16 includes the male screw part 16*b* extending along the axial line 16*a* of the fastening member 16 and the head part 16*c* protruding from the male screw part 16*b* so as to be away from the axial line 16*a*, the male screw part 16*b* of the fastening member 16 is capable of being screwed into the female screw part 15*d* of the collar 15 along the axial lines 15*a* and 16*a* of the collar 15 and the fastening member 16 from the tip of the shaft body part 15*b* of the collar 15, the fastening portion 14 is formed with the through hole 14*a* into which the shaft body part 15*b* of the collar 15 is capable of being inserted, and the lower lateral member 13 and the footrest bracket 22 are configured to be sandwiched between the head part 15*c* of the collar 15 and the head part 16*c* of the fastening member 16 when the male screw part 16*b* of the fastening member 16 is screwed into the female screw part 15*d* of the shaft body part 15*b* of the collar 15 inserted into the through hole 14*a* of the fastening portion 14.

In such a seat rail 10, the fastening portion 14 can prevent shear deformation in the front-rear direction of the adhesive G caused by the load applied to the rear part of the seat rail 10 by an occupant, luggage, or the like due to, for instance, traveling of a motorcycle on a rough road. Accordingly, the strength of the seat rail 10 can be efficiently improved. In addition, the head part 15*c* of the collar 15 protruding from the lower lateral member 13 can be used for positioning when the upper lateral member 12 is attached to the lower lateral member 13. Accordingly, production efficiency of the seat rail 10 can be improved.

The seat rail 10 according to the present embodiment includes the coupling member 17 extending to couple the two upper lateral members 12 spaced apart from each other in the width direction of the vehicle body 1, the coupling member 17 includes two lateral edges 17*a* located on both sides in the width direction of the vehicle body 1, and when the vehicle body 1 is viewed in the width direction, the fastening portion 14 overlaps the region P between the front end 17*b* and the rear end 17*c* of each of the lateral edges 17*a* in the coupling member 17 in the front-rear direction of the vehicle body 1.

In such a seat rail 10, the coupling member 17 can prevent the shear deformation in the front-rear direction of the adhesive G caused by a load applied to the rear part of the seat rail 10 by an occupant, luggage, or the like due to traveling of a motorcycle on a rough road, for instance. Accordingly, the strength of the seat rail 10 can be efficiently improved.

Although the embodiment of the present invention has been described above, the present invention is not limited to the above-described embodiment, and the present invention can be modified and changed based on the technical concept thereof.

The invention claimed is:

1. A motorcycle seat rail installed on a vehicle body of a motorcycle, the motorcycle seat rail comprising:
   an upper lateral member located on a lateral side in a width direction of the vehicle body and made of a fiber reinforced resin, the upper lateral member including a lower flange that protrudes in the width direction of the vehicle body from a lower edge of the upper lateral member; and
   a lower lateral member located downward from the upper lateral member and made of a metal,
   wherein a lower surface of the lower flange of the upper lateral member is joined to an upper surface of the lower lateral member by an adhesive.

2. The motorcycle seat rail according to claim 1, wherein:
   the lower lateral member is a hollow member extending from a front of the vehicle body toward a rear of the vehicle body.

3. The motorcycle seat rail according to claim 1, wherein:
   a fastening portion is provided to fasten the lower lateral member and a footrest bracket using a collar and a fastening member;
   the collar includes a shaft body part extending along an axial line of the collar, a head part protruding from the shaft body part so as to be away from the axial line, and a female screw part formed on the shaft body part so as to extend from a tip toward a base end of the shaft body part along the axial line;
   the fastening member includes a male screw part extending along an axial line of the fastening member and a head part protruding from the male screw part so as to be away from the axial line;
   the male screw part of the fastening member is capable of being screwed into the female screw part of the collar along the axial lines of the collar and the fastening member from the tip of the shaft body part of the collar;
   the fastening portion is formed with a through hole into which the shaft body part of the collar is insertable; and
   the lower lateral member and the footrest bracket are configured to be sandwiched between the head part of the collar and the head part of the fastening member when the male screw part of the fastening member is screwed into the female screw part of the shaft body part of the collar inserted into the through hole of the fastening portion.

4. The motorcycle seat rail according to claim 3, further comprising:
- a coupling member extending to couple two upper lateral members spaced apart from each other in the width direction of the vehicle body, wherein:
- the coupling member includes two lateral edges located on both sides in the width direction of the vehicle body; and
- when the vehicle body is viewed in the width direction, the fastening portion is overlapped on a region between a front end and a rear end of each of the lateral edges in the coupling member in a front-rear direction of the vehicle body.

* * * * *